US008846786B2

(12) United States Patent
De Waele et al.

(10) Patent No.: US 8,846,786 B2
(45) Date of Patent: Sep. 30, 2014

(54) AQUEOUS DISPERSED POLYESTER RESIN COMPOSITIONS

(75) Inventors: Luc De Waele, Denderwindeke (BE); Stephan Peeters, Heverlee (BE); Thierry Randoux, Braine-l'Alleud (BE); Edmund Urbano, Graz (AT)

(73) Assignee: Allnex Belgium S.A., Brussels (BE)

( * ) Notice: Subject to any disclaimer, the term of this patent is extended or adjusted under 35 U.S.C. 154(b) by 590 days.

(21) Appl. No.: 13/123,355

(22) PCT Filed: Oct. 9, 2009

(86) PCT No.: PCT/EP2009/063151
§ 371 (c)(1),
(2), (4) Date: May 19, 2011

(87) PCT Pub. No.: WO2010/040821
PCT Pub. Date: Apr. 15, 2010

(65) Prior Publication Data
US 2011/0217478 A1 Sep. 8, 2011

(30) Foreign Application Priority Data

Oct. 9, 2008 (EP) .................................... 08166282

(51) Int. Cl.
*C08J 7/18* (2006.01)
*C08L 67/07* (2006.01)
*C08L 67/08* (2006.01)
*C09D 11/101* (2014.01)
*C09D 167/08* (2006.01)
*C09D 11/105* (2014.01)

(52) U.S. Cl.
CPC ............ *C09D 167/08* (2013.01); *C09D 11/101* (2013.01); *C09D 11/105* (2013.01)
USPC .......................................... 523/504; 528/296

(58) Field of Classification Search
CPC .... C08K 5/103; C09D 11/101; C09D 11/105; C09D 167/06; C09D 167/08
USPC .......................................... 523/504; 528/296
See application file for complete search history.

(56) References Cited

U.S. PATENT DOCUMENTS

| | | | |
|---|---|---|---|
| 3,306,866 A * | 2/1967 | Percival et al. ............... | 523/336 |
| 3,979,346 A | 9/1976 | Zuckert et al. | |
| 4,133,786 A * | 1/1979 | Harris et al. .................. | 523/501 |
| 5,006,598 A | 4/1991 | Adams et al. | |
| 5,087,643 A * | 2/1992 | Truong ......................... | 523/176 |
| 5,304,612 A * | 4/1994 | Umetani et al. .............. | 525/528 |
| 5,548,005 A | 8/1996 | Kurth et al. | |
| 6,166,150 A | 12/2000 | Wilke et al. | |
| 6,262,149 B1 | 7/2001 | Clark et al. | |
| 6,627,700 B1 * | 9/2003 | Kadambande et al. ........ | 525/7.3 |
| 7,605,209 B2 | 10/2009 | Killilea et al. | |
| 2002/0077410 A1 | 6/2002 | Harakawa et al. | |
| 2004/0013895 A1 | 1/2004 | Dean et al. | |
| 2007/0082967 A1 | 4/2007 | James et al. | |
| 2007/0167603 A1 * | 7/2007 | Urbano et al. ................ | 528/272 |
| 2007/0299228 A1 * | 12/2007 | McNamee et al. ....... | 526/238.23 |
| 2011/0217478 A1 | 9/2011 | De Waele et al. | |
| 2012/0328795 A1 | 12/2012 | Peeters et al. | |

FOREIGN PATENT DOCUMENTS

| | | |
|---|---|---|
| EP | 0140323 B1 | 6/1987 |
| EP | 1792956 B1 | 7/2008 |
| EP | 2110410 A1 | 10/2009 |
| EP | 2143748 A1 | 1/2010 |
| EP | 2175000 A1 | 4/2010 |
| JP | S5079558 A | 6/1975 |
| JP | S5221033 A | 2/1977 |
| JP | S55139463 A | 10/1980 |
| JP | S6063263 A | 4/1985 |
| JP | 61-287918 A | 12/1986 |
| JP | 2002285046 A | 10/2002 |
| JP | 2007510792 A | 4/2007 |
| WO | WO-94/28043 A1 | 12/1994 |
| WO | WO-03/087244 A1 | 10/2003 |
| WO | WO-2004/009716 A1 | 1/2004 |
| WO | WO-2004035696 A2 | 4/2004 |
| WO | WO-2005047396 A1 | 5/2005 |
| WO | WO-2009/115489 A1 | 9/2009 |

OTHER PUBLICATIONS

J. Odeberg, Journal of Applied Polymer Science, 1996, vol. 62, 435-445, John Wiley & Sons.

* cited by examiner

*Primary Examiner* — Tae H Yoon
(74) *Attorney, Agent, or Firm* — Drinker Biddle & Reath LLP

(57) ABSTRACT

The invention relates to a radiation curable aqueously dispersed polyester resin composition containing an emulsifier D and the reaction product AC of a hydroxy functional polyester resin A and an olefinically unsaturated compound C which can be radically polymerized and which is attached to the polyester resin backbone by an ester linkage or a urethane linkage. The invention also relates to a process for its preparation and to a method of use thereof.

11 Claims, No Drawings

AQUEOUS DISPERSED POLYESTER RESIN COMPOSITIONS

CROSS-REFERENCE TO RELATED APPLICATIONS

This application is a national stage application (under 35 U.S.C. §371) of PCT/EP2009/063151, filed Oct. 9, 2009, which claims benefit of European application 08166282.7, filed Oct. 9, 2008.

FIELD OF THE INVENTION

This invention relates to aqueously dispersed polyester resin compositions suitable for the preparation of coating compositions, clear and pigmented coating compositions which can be applied to a variety of substrates, cured by irradiation and/or exposure to air, and provide these substrates with coating films having good mechanical and chemical resistance.

BACKGROUND OF THE INVENTION

Polyester resins, and among these particularly alkyd resins are one of the most common binder class used for ambient-cure, solvent-based coatings. The resistance properties of traditional solvent-borne alkyd resins are developed via autooxydative crosslinking of the paint film when subjected to air. Crosslinking occurs when the activated methylene groups in the unsaturated fatty acids or oils of the alkyd are oxidised in air to the corresponding hydroperoxides which subsequently decompose to generate free radicals, thus resulting in an oxydative crosslinking process. This oxydative crosslinking process is usually accelerated by adding the so-called driers, such as, for example, various salts of cobalt, zirconium, calcium, and manganese. However, alkyd resins have relatively slow "dry" or cure times, particularly at ambient temperatures. Various modifications have been made to alkyd resins to address such concerns.

One such attempt includes modification of a polyester resin or an alkyd resin with a vinyl or acrylic polymer, based on monomers such as styrene or methyl methacrylate, via a free radical polymerisation of these monomers in the presence of the alkyd resin, to produce a vinyl-alkyd copolymer or a so-called "vinylated alkyd" or "vinylated polyester".

Vinylated alkyd resins generally have a higher molar mass and a higher glass transition temperature (Tg), leading to coatings with reduced tack-free time. However, the so-called "through-dry time" (complete oxydation of unsaturation in the fatty acids forming the alkyd part of the modified resin) of such coatings is longer than in non-modified alkyds due to the decreased degree of unsaturation in the alkyd as a result of copolymerisation with the vinyl monomers. An additional drawback is that paint formulations containing vinylated alkyd resins require greater amounts of solvent, due to the increased molar mass and Tg of the vinylated alkyd.

Water-borne alkyd resins are applied in the form of aqueous emulsions or dispersions, and only need small quantities of coalescing additives. Evaporation of water and oxydative drying of the alkyd, however, occur on the same time scale as in solvent-borne alkyds. While other resin systems allow faster curing, the favourable properties of alkyd resins particularly on wood substrates, such as wood wetting ("Anfeuerung"), make the use of alkyds in this application field highly desirable.

In the published patent application WO 2003/087244 A1, a waterborne acrylate-functionalised alkyd coating composition is described which comprises an acrylate-functionalised alkyd resin, at least one drier, and water. The acrylate-functionalised alkyd resin comprises the reaction product of (a) an alkyd resin, (b) an acid anhydride, and (c) a glycidyl acrylate. The hydroxy end groups of the alkyd are converted to acid end groups by reaction of the alkyd resin with an acid anhydride to produce a carboxyl-functional resin, which in turn is then reacted with the glycidyl acrylate. A method of preparing a waterborne acrylate-functionalised alkyd coating composition is also disclosed comprising the step of contacting an acrylate-functionalised alkyd resin with at least one drier in the presence of water. Curing of these systems by irradiation has not been mentioned in this document.

Under the reaction conditions during the reaction of the hydroxy-functional alkyd resin with the acid anhydride, with the catalyst used for the synthesis of the alkyd resin still present, a certain amount of transesterification occurs, and if an acid-functional anhydride such as the trimellitic anhydride of WO 2003/087244 A1 is used, chain-branching will also be induced. The need for two consecutive reactions on the polymer is also a drawback. The unsaturation introduced by this process can be calculated from the amount of glycidyl acrylate (M=128.13 g/mol) corresponding to a mass fraction of from 3% to 12% in the resin, to be from 234 mmol/kg to 936 mmol/kg.

In the published patent application WO 2004/009 716 A1, alkyd-based free radical curable compositions are disclosed wherein the polymer comprises an alkyd portion, and a chain-pendant free radical curable portion which contains ethylenically unsaturated groups. These groups are connected to the polymer chain preferably via an isocyanate-functional ethylenically unsaturated compound, which is preferably a reaction product of a diisocyanate with a hydroxy-functional (meth)acrylic ester such as hydroxyethyl methacrylate, or of a diisocyanate with a hydroxyalkyl vinyl ether such as 4-hydroxybutyl vinyl ether. The hydroxy functional alkyd resins are prepared by converting the majority of the acid groups in an alkyd resin to hydroxyl groups by first reacting with an epoxide, such as neodecanoyl glycidyl ester. Modification of the alkyd resins as described here comprises three steps starting from a pre-formed alkyd: firstly, conversion of acid groups to hydroxyl groups by reaction with an epoxy compound, secondly, preparation of a functionalising agent by reacting a di-isocyanate with a hydroxy-functional ethylenically unsaturated compound, and thirdly, reaction of the hydroxy functional polyester or alkyd with the isocyanate functional unsaturated compound. The curable compositions described herein are solvent-borne.

It is therefore an object of the invention to provide a waterborne radiation-curable composition based on polyester resins or alkyd resins having olefinic unsaturation.

This object has been realised by providing a modified polyester or alkyd resin made by reaction of a hydroxy functional polyester or alkyd resin with an olefinically unsaturated compound having reactive groups which are reactive towards hydroxyl groups in the said polyester or alkyd resin, and by dispersing this modified polyester or alkyd resin in an aqueous medium using an emulsifier which is compatible with the said modified polyester or alkyd resin, to form a radiation-curable composition which can be radically polymerised following irradiation with high-energy radiation such as ultra-violet light or electron beams.

SUMMARY OF THE INVENTION

The invention therefore provides a radiation curable aqueously dispersed polyester or alkyd resin composition which can be radically polymerised following irradiation with high-energy radiation such as ultraviolet light or electron beams, and optionally also by oxidation in the presence of air, comprising an emulsifier D and the reaction product AC of a hydroxy functional polyester or alkyd resin A and an olefinically unsaturated compound C which can be radically polymerised, and which is attached to the polyester or alkyd resin backbone by an ester linkage or a urethane linkage.

The invention also provides a radiation curable aqueously dispersed polyester or alkyd resin composition comprising an emulsifier D and the reaction product AC of a hydroxy functional polyester or alkyd resin A and an olefinically unsaturated compound C which can be radically polymerised and which is attached to the polyester or alkyd resin backbone by an ester linkage or a urethane linkage, which composition additionally contains an olefinically unsaturated compound B which can be radically polymerised, wherein the radical polymerisation is initiated by the action of radiation, or of air, or preferably both.

The invention also provides a process for the preparation of a radiation curable aqueously dispersed polyester or alkyd resin composition where at first, a hydroxy functional polyester or alkyd resin A is prepared to which an olefinically unsaturated compound C is added, which compound C has functional groups which react with the hydroxyl groups of A, reacting A and C, and dispersing the reaction product AC of A and C in the presence of an emulsifier D in water to form a homogeneous mixture.

DETAILED DESCRIPTION OF THE PREFERRED EMBODIMENTS

The polyester or alkyd resin A is preferably an esterification product of a fatty acid A1 having from 8 to 30 carbon atoms, a polyhydric aliphatic alcohol A3 having at least three hydroxyl groups, and an aromatic, cycloaliphatic or linear or branched aliphatic carboxylic acid A4 having at least two carboxyl groups, or the anhydride thereof, and optionally an aliphatic or aromatic monocarboxylic acid A2 having at least two carbon atoms and not more than seven carbon atoms. According to a specific embodiment of the invention, the polyester A comprises at least one olefinic unsaturation in the molecule. This olefinic unsaturation can be introduced by using an unsaturated fatty acid A1, and/or by adding one or more oils A5 containing at least one olefinic unsaturation in the molecule. The presence of oils A5 is preferred, which oil particularly preferably has at least one olefinic unsaturation in the molecule.

The fatty acids A1 are preferably linear or branched aliphatic monocarboxylic acids, and preferably have from 8 to 24 carbon atoms, and may also have olefinic unsaturation. Useful acids are, i. a., caprylic acid, pelargonic acid, capric acid, lauric acid, myristic acid, palmitic acid, stearic acid, and behenic acid, and also unsaturated fatty acids such as linolic acid, linolenic acid, eleostearic acid, oleic acid, ricinoleic acid, palmitoleic acid, gadoleic acid, and arachidonic acid, to name only a few. They may be used alone, or preferably, in mixture. Mixtures of fatty acids from natural sources may also be used, such as cotton oil fatty acid, coconut oil fatty acid, and sunflower oil fatty acid.

The aliphatic or aromatic monocarboxylic acid A2 having at least two carbon atoms and not more than seven carbon atoms which may optionally be used in the synthesis of the alkyd resin, are aliphatic linear or branched, or aromatic acids, such as butyric acid, isobutyric acid, 2,2-dimethylpentanoic acid, valeric acid, caproic acid, heptanoic acid, and preferably, benzoic acid.

The polyhydric aliphatic alcohols A3 have at least three hydroxyl groups, and preferably from three to ten carbon atoms. They may be linear or branched, and may preferably be one or more of glycerol, threitol, erythritol, sorbitol, mannitol, trimethylol ethane, trimethylol propane, pentaerythritol, ditrimethylol ethane, ditrimethylol propane, and dipentaerythritol.

The aromatic, cycloaliphatic or linear or branched aliphatic carboxylic acids A4 having at least two carboxyl groups preferably have at least four carbon atoms, or at least eight carbon atoms if they are aromatic, and are preferably one or more of glutaric acid, adipic acid, pimelic acid, suberic acid, sebacic acid, and the so-called dimeric fatty acid synthesised from unsaturated fatty acid by a dimerisation process. Aliphatic cyclic diacids may be the isomers of cyclopentane dicarboxylic acid, cyclohexane dicarboxylic acid (such as hexahydrophthalic acid, hexahydroterephthalic acid, and tetrahydrophthalic acid), aromatic diacids may be phthalic, isophthalic, and terephthalic acids, 4,4'-diphenyl dicarboxylic acid, and also higher functional acids, such as trimellithic acid and benzophenonetetracarboxylic acid. Where intramolecular anhydrides of these acids exist, they may, of course, also be used in the synthesis.

The oils A5 are esters of glycerol with fatty acids which preferably have at least one olefinic unsaturation, or two or more of these. Preferably the oils are polyunsaturated oils, such as linseed oil, sunflower oil, perilla oil, or hempseed oil. Polyester or alkyd resins containing moieties derived from such at least monounsaturated oils, and preferably, polyunsaturated oils, lead to coating binders which can be used for dual cure systems, i.e. radical polymerisation induced by both irradiation, and air-drying.

The polyester or alkyd resins A are preferably prepared in a reaction where all components, the fatty acid A1, the optional aliphatic or aromatic monocarboxylic acid A2, the polyhydric alcohol A3, and the di- or polycarboxylic acid A4, and optionally, the oil A5, are charged into a reaction vessel and heated to a temperature of at least 100° C., preferably in the presence of an azeotrope former which forms an azeotrope with water generated in the polycondensation reaction, separation of the water formed, or distillation of the mixture of water and the azeotrope former, separation of water from the liquid mixture of the distillate which forms two phases upon condensation, and returning the azeotrope former into the reaction vessel. It is also possible to use two or more different compounds of at least one of the components A1 through A5 in the synthesis of the alkyd resin A. In another preferred embodiment, it is also possible to start the synthesis of the alkyd resin A by using an oil as an educt (starting material), which is an ester of glycerol (which belongs to the group of A3), and fatty acids which may be the same or different, and belong to the group of A1. Useful oils include linseed oil, soybean oil, cotton seed oil, coconut oil, sunflower oil, rapeseed oil, and safflower oil.

In a preferred embodiment of the invention, olefinically unsaturated compound B are also present in the radiation curable aqueously dispersed alkyd resin composition, which olefinically unsaturated compounds B can be radically polymerised following irradiation with high-energy radiation such as ultraviolet light or electron beams.

The olefinically unsaturated compound B which can be radically polymerised is preferably a reaction product of a polyol B1 and an olefinically unsaturated compound C which can be radically polymerised. Such compounds B are preferably esters of polyols B1 having at least two carbon atoms with compounds C selected from the same group as C1 infra, viz., olefinically unsaturated acids, preferably (meth)acrylic acid, such as glycerol tri(meth)acrylate or hexanediol di(meth)acrylate. Preferably, the polyols B1 are selected from the same group as the compounds A3 supra, where an additional modification consists in using reaction products of the polyols A3 with ethylene oxide and/or propylene oxide to yield ethoxylated or propoxylated or mixed alkoxylated polyols. C may also be selected from hydroxy functional olefinically unsaturated compounds, leading to, e.g., (meth)allyl ethers of the mentioned polyols B1. In a preferred embodiment, the compounds B themselves are not water-reducible, but form dispersions in water or aqueous solutions in the presence of an emulsifier D as described infra.

Compound B can be added to the reaction product AC in any stage, during or after its preparation. In a preferred embodiment of the invention, compound B is prepared in situ by reacting compound B1 with compound C during the reaction of alkyd resin A with compound C.

In the context of the present invention, a compound X or a mixture X' of compounds are called "water-reducible" if they form aqueous solutions or aqueous dispersions after preparing a homogeneous mixture, having a mass fraction of X or of X' in the solution or dispersion of at least 10%, and do not show phase separation upon storage at 20° C. and at least 24 hours after the preparation of the mixture.

The olefinically unsaturated compound C may be attached to the alkyd resin backbone by an ester bond, in which case the olefinically unsaturated compound C is an unsaturated acid C1 selected from the group consisting of alpha, beta-unsaturated aliphatic monocarboxylic acids, and monoesters of olefinically unsaturated aliphatic dicarboxylic acids. Useful compounds C1 are particularly olefinically unsaturated linear or branched aliphatic carboxylic acids having from 3 to 15 carbon atoms, such as acrylic and methacrylic acids, and their higher homologues such as ethacrylic acid, vinylacetic acid, crotonic, and isocrotonic acids. Other useful compounds are monoalkyl esters of olefinically unsaturated dicarboxylic acids, such as monomethyl or monoethyl maleate.

Another possibility is attaching the unsaturated compound via a urethane bond, for example, an isocyanate functional olefinically unsaturated compound C2 can be reacted with an alkyd resin A by addition to its hydroxyl groups, under formation of a urethane group. In this embodiment, the olefinically unsaturated compound C used is an isocyanate-functional reaction product C2. C2 can be the reaction product of an unsaturated aliphatic hydroxy-functional compound C21 and a diisocyanate or polyfunctional isocyanate C22 having three or more isocyanate groups per molecule. In this case, it is preferred to use compounds C21 containing an average of more than one double bound to make compounds C2, containing an average of more than one double bound.

Alternatively, the alkyd resin A can be first reacted with a diisocyanate or a polyfunctional isocyanate C22 and then be further reacted with compound C21.

This latter possibility where modification of the hydroxy functional alkyd resin is effected by reaction with compounds C2 involves multi-step reactions, while the direct esterification described in the first embodiment using compound C1 involves only one step for functionalisation, and is therefore preferred.

While basically, any emulsifier can be used which is compatible with the modified alkyd resin AC, it is preferred to use an emulsifier D which is the polyesterification product of a fatty acid D1, a polyhydric alcohol D2 having at least three hydroxyl groups per molecule, a di- or polycarboxylic acid D3 or its anhydride, more preferably a cycloaliphatic di- or polycarboxylic acid D3 or its anhydride, and a monoalkoxy polyalkylene glycol D4.

The fatty acids D1 are preferably unsaturated or saturated fatty acids having from 10 to 22 carbon atoms. According to a preferred embodiment, the fatty acid D1 is selected from unsaturated fatty acids D11 having an iodine number of at least 100 cg/g, preferably from 120 cg/g to 200 cg/g, in which isolated and conjugated double bonds may be present. These are obtained, for example, from vegetable oils such as soybean oil, from fish oil, from sunflower oil, linseed oil, safflower oil, and cottonseed oil by hydrolysis, or originate from the distillation of tall oil. Fatty acids with conjugated double bonds which are also useful for the purposes of this invention are obtained by catalytic isomerisation of natural fatty acids or from dehydrated castor oil (ricinene fatty acid).

In addition, it is also possible, in whole or in part, to use saturated fatty acids D12 having from ten to twenty-two carbon atoms. Suitable examples include lauric acid, palmitic acid, and stearic acid.

The polyhydric alcohol D2 having at least three hydroxyl groups per molecule, are linear or branched or cyclic aliphatic compounds having at least three carbon atoms per molecule. Other than glycerol, erythritol, threitol, pentaerythritol, trimethylolpropane and trimethylol ethane, and compounds derived from these such as dipentaerythritol, ditrimethylolpropane and ditrimethylol ethane, the so-called "sugar alcohols are particularly preferred, such as the hexitols ($C_6$ sugar alcohols), which may be partly or even wholly replaced by pentitols ($C_5$ sugar alcohols). Among the hexitols, preference is given to the use of sorbitol, mannitol and dulcitol, and among the pentitols, to the use of arabitol and xylitol, and also mixtures thereof.

The carboxylic acid D3 is preferably a cycloaliphatic carboxylic acid D3, more preferably having at least two carboxylic acid groups, and is particularly preferably a saturated or partly unsaturated acid having from 6 to 12, especially preferred from 8 to 10, carbon atoms, such as hexahydrophthalic acid, tetrahydrophthalic acid and its alkyl derivatives, e.g., methyltetrahydrophthalic acid, which acids are used preferably in the form of their anhydrides. It is likewise possible to use cyclohexane-1,3- and -1,4-dicarboxylic acid and the dicarboxylic acids derived from polycyclic, especially bicyclic hydrocarbons, or the anhydrides of these acids, such as, for example, bicyclo-[2.2.2]oct-5-ene-2,3-dicarboxylic anhydride. Surprisingly, fumaric acid, succinic anhydride and maleic anhydride, and also aromatic dicarboxylic acids such as phthalic acid, isophthalic acid and terephthalic acid, for example, have not proven suitable; they result in a higher hydrolysis rate and poorer stability of the alkyd resin emulsions.

The monoalkoxy polyalkylene glycol D4 has 1 to 8, preferably 1 to 4, carbon atoms in the alkoxy radical and preferably, a number-average molar mass of from 500 g/mol to 2000 g/mol, particularly preferably from 600 g/mol to 1800 g/mol. Up to 20% of the oxyethylene units may also be replaced by oxypropylene units. Particular preference is given to methoxy-, ethoxy- and n-butoxy-polyethylene glycols having a number-average molar mass of from 600 g/mol to 1800 g/mol.

The emulsifier D is obtainable by reacting, under polycondensation conditions, the components D1, D2, D3, and D4, preferably in an analogous way to the preparation of the alkyd resin A as described supra.

It is additionally possible in the mixture of starting materials to use monocarboxylic acids D11 which are different from the fatty acids D1, such as aliphatic linear or branched monocarboxylic acids having up to nine carbon atoms, such as 2-ethyl hexanoic acid, or aromatic monocarboxylic acids such as benzoic acid, the isomers of toluic acid, phenylacetic acid, and the isomers of tolylacetic acid.

To prepare the emulsifier resins D it is preferred to use the following mass fractions in the mixture of starting materials:
from 10% to 40%, preferably from 15% to 35%, of the polyhydroxyl component D2,
from 35% to 70%, preferably from 40% to 60%, of the alkoxypolyethylene glycol D4,
from 10% to 30%, preferably from 15% to 25%, of the cycloaliphatic di- or polycarboxylic acid D3,
from 15% to 40%, preferably from 20% to 35%, of the fatty acid D1, and
from 0% to 15%, preferably from 3% to 10%, of another monocarboxylic acid D11 which is different from D1.

The polycondensation takes place preferably up to an acid number of the polycondensate D of less than 10 mg/g, the solution of D in water having a mass fraction of solids of from 30% to 60% and a dynamic viscosity of from 5000 mPa·s to 50 000 mPa·s. The acid number of the emulsifier D is particularly preferably less than 5 mg/g. A higher acid number can be adjusted to this preferred range by reaction of the polycondensate D with an epoxide, such as an ester of glycidol with an alkanoic acid, preferably, a glycidol ester of a branched aliphatic acid having from 5 to 12 carbon atoms, such as neopentanoic, 2-ethylhexanoic, or neodecanoic acid.

It is also possible to use an oil in the synthesis of the emulsifier D as an educt (starting material), which is an ester of glycerol (which belongs to the group of D2), and fatty acids which may be the same or different, and belong to the group of D1. Useful oils include linseed oil, soybean oil, cotton seed oil, coconut oil, sunflower oil, rapeseed oil, and safflower oil.

The reaction product AC of a hydroxy functional alkyd resin A and an olefinically unsaturated compound C which can be radically polymerised and which is attached to the alkyd resin backbone by an ester linkage or a urethane linkage can be prepared by the following process:

If a compound according to the group of compounds C1 is used, the alkyd resin A is mixed with an esterification catalyst, and preferably, also a polymerisation inhibitor to avoid premature polymerisation of compound C1. This mixture is heated to a temperature of preferably from 70° C. to 110° C., homogenised, and lean air with an oxygen content of from 3% to 10% is bubbled though this composition. Compound C1 is then added, preferably in stoichiometric excess, while maintaining the lean air stream, and the reaction mass is heated to preferably from 115° C. to 145° C. The esterification reaction is preferably accelerated by removing the water formed in the condensation reaction by azeotropic distillation, and the reaction is continued until the acid number of the reaction mass which is monitored during the reaction indicates conversion of more than 90% of the hydroxyl groups in the alkyd resin. The azeotrope former and the excess of compound C1 are then removed, by distillation under reduced pressure, and the modified alkyd resin is isolated.

If a compound according to C2 is used, in a first step, the isocyanate functional olefinically unsaturated compound C2 is prepared from an unsaturated aliphatic alcohol C21 and a diisocyanate or polyfunctional isocyanate C22 having three or more isocyanate groups per molecule, and this compound C2 is then reacted with the alkyd resin under formation of a urethane bond by addition to its hydroxyl groups, under formation of a urethane group.

Alternatively, in the first step, the alkyd resin A can be reacted with compound C22, and then this reaction product is further reacted with compound C21.

If a compound according to B, in a further preferred embodiment, is also present in the composition, its precursor B1, the polyol, is mixed with the alkyd resin A prior to reaction thereof with C, in which case a reaction product of A with C and a reaction product of B1 with C are formed concurrently. It is also possible to react the polyol B1 with a compound of class C which is the same as, or different from, the compound of class C which is to be used to modify the alkyd resin A. In this case, the reaction product B is formed separately, and this reaction product B is then admixed to A before reaction thereof with C, or the reaction product B is mixed with the reaction product AC of A and C.

The modified alkyd resin AC (or the mixture of AC and B) is then admixed to the emulsifier D, preferably at elevated temperature of from 40° C. to 80° C., and well homogenised, and then dispersed in water, or, preferably, water is added in portions to the well homogenised heated (from 40° C. to 80° C. as stated supra) mixture of the emulsifier D and the modified alkyd resin AC (or the mixture of AC and B).

The radiation curable aqueously dispersed alkyd resin compositions according to the invention are formulated to coating compositions by addition of appropriate additives, such as photoinitiators (for UV curing), biocides, pigments, dyestuffs, fillers, levelling, anti-settling and flow additives, and also optionally further radiation curable binders that are preferably either self-emulsifying, or externally emulsified.

These coating compositions can be used, i. a. as inks, overprint varnishes, and lend themselves particularly well to coat paper, cardboard, wood or wood materials, as well as plastics and metal.

The coating compositions comprising a reaction product AC and/or an emulsifier D based on an unsaturated fatty acid or oil comprising at least one olefinic unsaturation in the molecule can be cured by radiation and/or air drying.

The present invention further provides a method of use of the composition according to the invention, comprising adding one or more of additives selected from the group of photoinitiators, pigments, colourants, dispersing agents, flow additives, thickening agents, matting agents, and adhesion promoters, to the polyester resin composition according to the invention, mixing and homogenising the mixture thus obtained, to obtain a paint, coating or ink and applying the said paint, coating or ink to the surface of a substrate in the form of a wet film, drying or flushing off at least a part of the water and optionally, other volatile components comprised in the said film, and exposing the coated substrate to high energy radiation sufficient to cure the film.

According to a specific preferred embodiment, siccatives are additionally used as additives, and the coated substrate is concurrently with, or after, the irradiation, subjected to air oxidation to provide air drying.

The following examples are provided to further explain the invention, without limiting it. In the examples, as well as in the specification, the following definitions are used:

The acid number is defined, according to DIN EN ISO 3682 (DIN 53 402), as the ratio of that mass $m_{KOH}$ of potassium hydroxide which is needed to neutralise the sample under examination, and the mass $m_B$ of this sample, or the mass of the solids in the sample in the case of a solution or dispersion; its customary unit is "mg/g".

The hydroxyl number is defined according to DIN EN ISO 4629 (DIN 53 240) as the ratio of the mass of potassium hydroxide $m_{KOH}$ having the same number of hydroxyl groups as the sample, and the mass $m_B$ of that sample (mass of solids in the sample for solutions or dispersions); the customary unit is "mg/g".

Unless explicitly stated otherwise, all quantities having the unit "%" ("g/(100 g)", or "cg/g"), particularly a concentration or strength of a solution or dispersion, are mass fractions, calculated by dividing the mass of the dissolved or dispersed or admixed substance, by the mass of the solution or dispersion or mixture.

Dynamic viscosity is measured at 25° C. with a shear rate of 100 s$^{-1}$, using a cone and plate viscometer.

EXAMPLES

Vinyl-Functional Alkyd Resin

Example R1

Mixture of Vinyl Functional Alkyd Resin and Vinyl Functional Polyol

In a standard synthetic resin reactor, 62 kg of benzoic acid, 105 kg of coconut oil fatty acid, 87 kg of pentaerythritol, and 70 kg of phthalic anhydride were heated to 230° C. Azeotropic distillation at 230° C. using toluene as azeotrope former and subsequent dilution to a mass fraction of solids 80% with toluene yielded 373 kg of an alkyd resin having an acid number of 3.0 mg/g, a dynamic viscosity, diluted with toluene to a mass fraction of solids of 50%, of 45 mPa·s, and a hydroxyl number of 120 mg/g. The alkyd resin was mixed at 90° C. with 87 kg of glycerol propoxylate having an average molar mass of 355 g/mol, 2.5 kg of p-toluene sulphonic acid, and 1.2 kg hydroquinone monomethyl ether were added as catalyst and inhibitor, respectively. After addition of 78.5 kg of acrylic acid the reaction mass was heated to 125° C. while a flow of 3 m$^3$/h of lean air with an oxygen content of 7% was bubbled through the reactor. At 125° C., azeotropic distillation using toluene as azeotrope former was performed until an acid number of less than 30 mg/g was reached. Subsequent distillation under reduced pressure to remove the azeotrope former gave 445 kg of a product having a purity of 99.5%, an acid number of 10 mg/g, and a dynamic viscosity of 25 Pa·s.

Example R2

Vinyl Functional Alkyd Resin

As in example R1, 137 kg of cotton oil fatty acid, 87 kg of pentaerythritol, and 74 kg of phthalic anhydride were heated to 230° C. Azeotropic distillation at 230° C. using toluene as azeotrope former and subsequent dilution of the resulting resins to a mass fraction of solids of 80% with toluene yielded 373 kg of an alkyd resin having an acid number of 1.5 mg/g, a dynamic viscosity, measured on a solution diluted with toluene to a mass fraction of solids of 50%, of 40 mPa·s, and a hydroxyl number of 210 mg/g. Into this alkyd resin, 2.5 kg of p-toluene sulphonic acid and 1.2 kg hydroquinone monomethyl ether were added as catalyst and inhibitor, respectively. After adding 85 kg of acrylic acid the reaction mass was heated to 125° C. while a flow of 3 m$^3$/h of lean air with an oxygen content of 7% was bubbled through the reactor. At 125° C., azeotropic distillation using toluene as azeotrope former was performed until an acid number of less than 30 mg/g was reached. Subsequent distillation under reduced pressure to remove the toluene and acrylic acid in excess gave 340 kg of a product having a purity of 99.0%, an acid number of 12 mg/g and a dynamic viscosity of 13 Pa·s.

Example R3

Vinyl Functional Alkyd Resin

In a standard synthetic resin reactor, 210 kg of soybean oil and 55 kg of pentaerythritol were transesterified at 265° C. using 0.03 g of lithium hydroxide as catalyst, and after adding 82 kg of phthalic anhydride at 200° C., the reaction mixture was heated to 230° C. Azeotropic distillation at 230° C. using toluene as azeotrope former and subsequent dilution to a mass fraction of solids of 80% with toluene yielded 422 kg of an alkyd resin having an acid number of 5.0 mg/g, a dynamic viscosity measured on a 60% strength solution in toluene, of 250 mPa·s, and a hydroxyl number of 90 mg/g. This alkyd resin was mixed at 90° C. with 2.5 kg of p-toluene sulphonic acid and 1.2 kg of hydroquinone monomethyl ether, as catalyst and inhibitor, respectively. After adding 42.2 kg of acrylic acid the reaction mass was heated to 125° C. while a flow of 3 m$^3$/h of lean air with an oxygen content of 7% was bubbled through the reactor. At 125° C., azeotropic distillation using toluene as azeotrope former was performed until acid number of less than 30 mg/g was reached. Subsequent distillation under reduced pressure to remove the toluene and excess of acrylic acid gave 374 kg of a product having a purity of 99.0%, an acid number of 9 mg/g and a dynamic viscosity of 42 Pa·s.

Example R4

Vinyl Functional Alkyd Resin 34.1 kg of toluene diisocyanate were reacted with 23 kg of hydroxyethyl acrylate and 0.02 kg of dibutyltin dilaurate as catalyst and 0.09 kg of butylated hydroxytoluene as stabiliser. Reaction was done at a temperature not exceeding 50° C. and resulted in a product with a specific isocyanate group content of 3.44 mmol/g (corresponding to a mass fraction of isocyanate groups, M=42.02 g/mol, of 14.4%). This product is referred to as M1.

100 kg of an alkyd resin as prepared in example R1 with a mass fraction of solids of 100% having a hydroxyl number of 110 mg/g were mixed with 44.8 kg of glycerol propoxylate tri-acrylate and 0.05 kg of dibutyltin dilaurate as catalyst and 0.05 kg of butylated hydroxytoluene as stabiliser. This mixture is referred to as M2.

Components M1 and M2 were added together in a reactor and heated to 85° C. Maturation was done at 85° C. resulting in a specific isocyanate group content of not more than 0.05 mmol/g (corresponding to a mass fraction of isocyanate groups, M=42.02 g/mol, of 0.20%). Post-stabilisation was done with 0.05 kg of butylated hydroxytoluene. Further dilution with 22 kg of glycerol propoxylate tri-acrylate resulted in a urethane acrylate product with a dynamic viscosity at 60° C. of 15 Pa·s.

Example R5

Vinyl Functional Alkyd Resin 43.6 kg of isophorone diisocyanate were reacted with 23 kg of hydroxyethyl acrylate and 0.02 kg of dibutyltin dilaurate as catalyst and 0.10 kg of butylated hydroxytoluene as stabiliser. Reaction was done at a temperature not exceeding 50° C. and resulted in a product with a specific isocyanate group content of 2.96 mmol/g (corresponding to a mass fraction of isocyanate groups, M=42.02 g/mol, of 12.4%). This reaction product is referred to as M1.

100 kg of an alkyd resin as prepared in example R1 with a mass fraction of solids of 100% having a hydroxyl number of 110 mg/g were mixed with 47.5 kg of glycerol propoxylate tri-acrylate and 0.05 kg of dibutyltin dilaurate as catalyst and 0.05 kg of butylated hydroxytoluene as stabiliser. This mixture is referred to as M2.

Both components M1 and M2 were added together in a reactor and heated to 85° C. Maturation was done at 85° C. resulting in a specific isocyanate group content of not more than 0.05 mmol/g (corresponding to a mass fraction of isocyanate groups, M=42.02 g/mol, of 0.20%). Post-stabilisation was done with 0.05 kg of butylated hydroxytoluene. Further dilution with 24 kg of glycerol propoxylate tri-acrylate resulted in a urethane acrylate product with a dynamic viscosity at 60° C. of 10 Pa·s.

Example R6

Vinyl Functional Alkyd Resin 34.1 kg of toluene diisocyanate were reacted with 26 kg of hydroxypropyl acrylate and 0.02 kg of dibutyltin dilaurate as catalyst and 0.1 kg of butylated hydroxytoluene as stabiliser. Reaction was done at a temperature not exceeding 50° C. and resulted in a product with a specific isocyanate group content of 3.29 mmol/g (corresponding to a mass fraction of isocyanate groups, M=42.02 g/mol, of 13.8%). This product is referred to as M1.

100 kg of an alkyd resin as prepared in example R1 with a mass fraction of solids of 100% having a hydroxyl number of 110 mg/g were mixed with 45.6 kg of glycerol propoxylate tri-acrylate and 0.05 kg of dibutyltin dilaurate as catalyst and 0.05 kg of butylated hydroxytoluene as stabiliser. This mixture is referred to as M2.

Both components M1 and M2 were added together in a reactor and heated to 85° C. Maturation was done at 85° C. resulting in a specific isocyanate group content of not more than 0.05 mmol/g (corresponding to a mass fraction of isocyanate groups, M=42.02 g/mol, of 0.20%). Post-stabilisation was done with 0.05 kg of butylated hydroxytoluene. Further dilution with 23 kg of glycerol propoxylate tri-acrylate resulted in a urethane acrylate product with a dynamic viscosity at 60° C. of 15 Pa·s.

Example R7

Vinyl Functional Alkyd Resin

In a standard synthetic resin reactor, 410 kg of linseed oil, 8 kg of tall oil fatty acid, 70 kg of glycerol and 24 kg of pentaerythritol were transesterified at 260° C. using 0.10 kg of lithium hydroxide as catalyst, and after adding 135 kg of phthalic anhydride at 180° C., the reaction mixture was heated to 230° C. under azeotropic distillation. When an acid value of <3 mg/g was achieved, distillation under reduced pressure was performed at 230° C. and yielded 631 kg of a solvent-free alkyd resin having an acid number of 0.5 mg/g, a dynamic viscosity measured on a 60% strength solution in toluene, of 100 mPa·s, and a hydroxyl number of 100 mg/g.

100 kg of this alkyd resin were mixed with 52 kg of the reaction product of toluene di-isocyanate and hydroxyethyl acrylate (as described in example R6) and heated to 85° C. Maturation was done at 85° C. and resulting in a specific isocyanate group content of not more than 0.05 mmol/g (corresponding to a mass fraction of isocyanate groups, M=42.02 g/mol, of 0.20%). Post-stabilisation was done with 0.05 kg of butylated hydroxytoluene. Further dilution with 17 kg of glycerol propoxylate tri-acrylate resulted in a urethane acrylate product with a dynamic viscosity at 60° C. of 20 Pa·s.

Example R8

Vinyl Functional Alkyd Resin 34.1 kg of toluene diisocyanate were reacted with 74 kg of ditrimethylolpropane triacrylate and 0.02 kg of dibutyltin dilaurate as catalyst and 0.1 kg of butylated hydroxytoluene as stabiliser. Reaction was done at a temperature not exceeding 50° C. and resulted in a product with a specific isocyanate group content of 1.81 mmol/g (corresponding to a mass fraction of isocyanate groups, M=42.02 g/mol, of 7.6%). This product is referred to as M1.

100 kg of an alkyd resin as prepared in example R1 with a mass fraction of solids of 100% having a hydroxyl number of 110 mg/g were mixed with 59.1 kg of glycerol propoxylate tri-acrylate and 0.06 kg of dibutyltin dilaurate as catalyst and 0.06 kg of butylated hydroxytoluene as stabiliser. This mixture is referred to as M2.

Both components M1 and M2 were added together in a reactor and heated to 85° C. Maturation was done at 85° C. resulting in a specific isocyanate group content of not more than 0.05 mmol/g (corresponding to a mass fraction of isocyanate groups, M=42.02 g/mol, of 0.20%). Post-stabilisation was done with 0.05 kg of butylated hydroxytoluene. Further dilution with 630 kg of glycerol propoxylate tri-acrylate resulted in a urethane acrylate product with a dynamic viscosity at 60° C. of 62.8 Pa·s.

Emulsifier

Example E1

In a standard synthetic resin reactor, 476 kg of sunflower oil fatty acid, 176 kg of sorbitol, 335 kg of tetrahydrophthalic acid anhydride, and 2 kg of dibutyltin dilaurate as catalyst were heated to 180° C., 820 kg of monomethoxy polyethylene glycol having a number-average molar mass of 750 g/mol were added, and the mixture was heated further to 230° C. Azeotropic distillation at 230° C. using xylene as azeotrope former and subsequent distillation under reduced pressure to remove the azeotrope former gave 1850 kg of a product having a purity of 100%, an acid number of 3 mg/g and a dynamic viscosity, diluted with water to a mass fraction of solids of 45%, of 7500 mPa·s.

Example E2

27.2 kg of linseed oil and 7.2 kg of glycerol were transesterified at 265° C. with 5 g of lithium hydroxide as catalyst until the reaction mass was infinitely soluble in ethanol. After cooling to 100° C., 21.2 kg of hexahydrophthalic acid anhydride and 46.4 kg of monomethoxy polyethylene glycol having a number-average molar mass of 750 g/mol were charged, 0.2 kg of triethyl amine were added as catalyst and the reaction mixture was heated further to 230° C. Azeotropic distillation at 230° C. using xylene as azeotrope former and subsequent distillation under reduced pressure to remove the xylene gave 100 kg of a product having an acid number of 1.5 mg/g and a dynamic viscosity, diluted with water to a mass fraction of solids of 50%, of 7200 mPa·s.

Example E3

As in Example E1, 15.8 kg of coconut oil fatty acid, 9.6 kg of glycerol, 19.1 kg of tetrahydrophthalic acid anhydride, and 0.09 kg of triethylamine as catalyst were heated to 180° C., 55.3 kg of monobutoxy polyethylene glycol having a number-average molar mass of 750 g/mol were added, and the mixture was heated to 230° C. Azeotropic distillation at 230° C. using xylene as azeotrope former and subsequent distillation under reduced pressure to remove the azeotrope former gave 100 kg of a product having a purity of 100%, and an acid number of 8 mg/g. The residual carboxyl functions were reacted with 3.7 kg of neodecanoic acid oxiranylmethyl ester to an acid number of less than 1.0 mg/g. Dynamic viscosity of the product, measured on a 50% strength dispersion in water, was 5500 mPa·s.

Examples 1 to 12

The emulsions were prepared in accordance with the invention in the proportions and under the conditions stated in Table 1. Component E was charged to a standard synthetic resin reactor with an appropriate stirrer and the preheated component R (temperature of addition $T_R$) was added with stirring over the course of 60 minutes. Following homogenisation for one hour, the product was diluted to the desired application viscosity corresponding to a mass fraction of solids of from 63% to 67% in the emulsion by adding desalinated water in portions.

All emulsions gave films which corresponded to the solvent-containing systems in terms of drying properties and film quality. The stability of the emulsions was determined by storage at 40° C. and 80° C. and also 3 freeze-thaw cycles at −10° C./25° C. All emulsions of the invention were still satisfactory after 240 hours (80° C.) and after 2160 hours (40° C.). After 3 freeze-thaw cycles, there were no significant changes in the emulsions.

TABLE 1

Preparation of the emulsions, Examples 1 to 8

| | Component R | | | Component E | | | Emulsion |
|---|---|---|---|---|---|---|---|
| Ex. | Type | $w_s$/% | $T_R$/° C. | Type | $w_s$/% | $w_s$/% | $\eta$/mPa·s |
| 1 | R1 | 90 | 60 | E1 | 10 | 65 | 1320 |
| 2 | R2 | 90 | 35 | E1 | 10 | 65 | 720 |
| 3 | R3 | 88 | 60 | E1 | 12 | 66 | 150 |
| 4 | R1 | 85 | 50 | E2 | 15 | 66 | 1210 |
| 5 | R2 | 85 | 35 | E2 | 15 | 64 | 620 |
| 6 | R3 | 88 | 60 | E2 | 10* | 67 | 1180 |
| 7 | R1 | 88 | 60 | E3 | 10* | 65 | 1160 |
| 8 | R2 | 85 | 35 | E3 | 15 | 63 | 970 |

*oleyl alcohol ethoxylate, having a mass fraction of oxyethylene unit of approximately 80%, was further added in an amount corresponding to a mass fraction of 2% of the oleyl alcohol ethoxylate in the solids part of the emulsion $w_s$: mass fraction of solids
$\eta$: dynamic viscosity The emulsions of Examples 1 to 8 were tested, in comparison to CE1 (comparative example 1), a commercial UV curing system comprising an aqueously dispersed polyurethane acrylate, having a viscosity of 60 mPa·s, a mass fraction of solids of 40%, and a pH of 7.2, and CE2 (comparative example 2), a commercial oxydatively drying water borne alkyd which is both urethane and acrylic modified, having a mass fraction of solids of 42%, a viscosity of 700 mPa·s at 23° C., and a pH of 8.0.

To the compositions of the examples, a photo-initiator blend (1% of the mass of binder solids in the emulsion of a mixture of equal masses of benzophenone and CPK (1-hydroxy-cyclohexyl-phenyl ketone) and 0.5% of the mass of binder solids in the emulsion of IRGACURE® DW 819 (a 45% strength dispersion of bis-acyl phosphine oxide in water, Ciba Specialty Chemicals) and 1.5% of the binder solids of an uncoated thermally processed silica having an average particle size of 10 μm (®Acematt TS 100, Degussa—Evonik Industries) and 3% of the mass of the binder solids of an aqueous high-density polyethylene wax dispersion having an average particle size of 25 μm (®Aquamat 208, BYK-Chemie GmbH) as matting agents. The viscosity of the formulated composition was adjusted to between 500 mPa·s and 1000 mPa·s by adding a quantity of a mixture of equal masses of a polyether polyurethane thickener (ADDITOL® VXW 6360, Cytec Surface Specialties Austria GmbH) and desalinated water corresponding to 1.5% of the mass of binder solids in the emulsion. The formulated composition was applied with an areal load of from 12 g/m² to 14 g/m² on sappelli and beech panels and dried in an oven at 80° C. for five minutes. The radiation curing was effected by exposing the coated and dried panels to a mercury ultra-violet lamp with a of 80 W/cm at conveyor speeds of 5 m/min, 10 m/min, and 15 m/min. The panels were evaluated for reactivity, scratch resistance (using coin test, Hamberger Hobel test, Erichsen scratch test) and adhesion and "Anfeuerung" (wood wetting).

The following test methods were used:

Reactivity is expressed as speed of the conveyor in m/min which gives a coating that withstand fifty acetone double rubs (ADR Test) or scratching with a finger nail. This method covers the minimum UV—dose which is necessary to fully crosslink a UV-curing coating. The nail scratch resistance is performed at room temperature by scratching the coating with a finger nail 1 hour after the UV curing.

Adhesion procedure is based on standards ASTM D3359, DIN 53 151, and ISO 2409. A string of adhesive tape is put on the surface and snatched off. Rating is from "5B" (best) to "0B" (worst).

"Anfeuerung" covers the wetting of wood and the enhancement of the wooden structure. The test is performed by applying a coating on sappelli, drying it and curing it by UV. A visual inspection is used to evaluate the warm wet look aspect, compared to a reference. Sappelli is chosen as it is a dark wood and appropriate to evidence whitening coming from a waterborne system. Rating is from "1" (best) to "5" (worst).

Scratch resistance is evaluated with the so-called "coin test", according to the method of Hamberger, and according to the Erichsen method.

With the coin test, the cured film is scratched with a coin with sharp edges (a mint-fresh 2 €-coin is used). The scratched surface is compared with a reference sample after the microcracks have been coloured by methylene blue solution (1% strength in water). Rating is done on a scale from 1 (best) to 5 (worst).

Scratch resistance test with Hamberger Hobel: The test is performed at room temperature by scratching the coating with the Hamberger Hobel test equipment after 1 hour. The result is expressed in Newton. A high level is expected to provide the best protection against any household deterioration. The coating must be applied onto a rigid and flat substrate, and the apparatus must be pressed on it. The pressure on the screw is increased until a scratch of a few centimeters is made on the coated surface. The force applied by the tip of the screw is recorded.

Scratch resistance evaluation with Erichsen method: The weight where the scratch-pin scratches the surface of the coating is determined. The higher the applied weight, the better is the scratch resistance of a coating. The result is read as weight in N.

The results for Examples 1 to 8 are compiled in Table 2:

|  | Reactivity | | | | Scratch Resistance | | |
|---|---|---|---|---|---|---|---|
| Example | ADR Test m/min | Nail Test m/min | Adhesion | An- feuerung | Coin Test | Ham- berger N | Erich- sen N |
| 1 | 2 × 5 | 10 | | 1 to 2 | 2 to 3 | 15 | 2 |
| 2 | 2 × 5 | 10 to 15 | 4B | 1 | 2 | <10 | 2 |
| 3 | 2 × 5 | 5 | 4B | 1 | 1 | <10 | 1 |
| 4 | 2 × 5 | 15 | 5B | 1 to 2 | 3 | 15 | 3 |
| 5 | 2 × 5 | 10 to 15 | 4B | 1 to 2 | 2 to 3 | 10 | 2 |
| 6 | 2 × 5 | 5 to 10 | 4B | 1 | 2 | <10 | 2 |
| 7 | (1 to 2) × 5 | 15 | 5B | 1 to 2 | 3 to 4 | 10 | 3 |
| 8 | 2 × 5 | 10 | 3B | 2 | 2 | <10 | 2 |
| CE1 (UV) | 2 × 5 | 10 to 15 | 5B | 2 | 3 | 15 | 3 |
| CE2 (ox) | n. a. | n. a. | 0B | 5 | 2 | <10 | 1 |

By "2×5", two passes at a velocity of 5 m/min each are meant. It can be seen from this table that radiation curable compositions based on alkyd resins, according to the invention, have the same favourable properties regarding reactivity, scratch resistance, and adhesion, as commercial UV curing systems based on polyurethane acrylates, but show better wood wetting and wood structure enhancement ("Anfeuerung").

Examples 9 to 12

Further emulsions were prepared in accordance with the invention using the proportions and conditions as stated in table 4. Component E was first charged to a standard synthetic resin reactor with an appropriate stirrer and the preheated component R (temperature of addition $T_R$) was added with stirring over the course of 60 minutes. Following homogenisation for one hour, the product was diluted to the desired application viscosity corresponding to a mass fraction of solids of from 63% to 67% in the emulsion by adding desalinated water in portions.

All emulsions gave films which corresponded to the solvent-containing systems in terms of drying properties and film quality. The stability of the emulsions was determined by storage at 40° C. and 80° C. and also 3 freeze-thaw cycles at −10° C./25° C. All emulsions of the invention were still satisfactory after 240 hours (80° C.) and after 2160 hours (40° C.). After 3 freeze-thaw cycles, there were no significant changes in the emulsions.

TABLE 4

Preparation of the emulsions, Examples 9 to 12

| | Component R | | Component E | | Emulsion | |
|---|---|---|---|---|---|---|
| Ex. | Type | $w_s$/% | Type | $w_s$/% | $w_s$/% | η/mPa · s |
| 9 | R5 | 100 | E3 | 55.0 | 64.4 | 1100 |
| 10 | R6 | 100 | E3 | 55.0 | 64.8 | 1215 |
| 11 | R7 | 100 | E3 | 55.0 | 63.3 | 2145 |
| 12 | R8 | 100 | E3 | 55.0 | 63.0 | 3240 |

In example 11, a water-emulsifiable combination siccative (comprising mass fractions of each of ca. 5% cobalt, ca. 0.22% lithium, and ca. 7.5% zirconium, free from nonylphenol ethoxylate) is added, to provide a mass ratio of metals to binder solids of ca. 2%. The other additives, and processing conditions were as described fro examples 1 to 8. The hardness values listed in table 6 are pendulum hardness values, determined according to the method of Persoz (DIN EN ISO 1522), stated as damping time measured in seconds. All other test methods are as explained supra.

TABLE 5 results

| | Reactivity | | | | Resistance | | |
|---|---|---|---|---|---|---|---|
| Example | ADR Test m/min | Nail Test m/min | Adhesion | An- feuerung | Scratch Coin Test | Ham- berger N | Erich- sen N |
| 9 | 20 | 15 | 5B | 1 | 1 | 5 | 3 |
| 10 | 25 | 15 | 5B | 1 | 1 | <10 | 3 |
| 11 | >3 × 5 | 10 | 5B | 1 | 1 | <10 | 2 |
| 12 | 30 | 20 | 5B | 1 | 1 | <10 | 3 |
| CE1 (UV) | 2 × 5 | 10 to 15 | 5B | 2 | 3 | 15 | 3 |
| CE2 (ox) | n. a. | n. a. | 0B | 5 | 2 | <10 | 1 |

The results show that the composition of Example 12 wherein a multifunctional acrylate was used to react with the alkyd resin, provides higher reactivity compared to the monofunctional products.

Table 6 shows a comparison of air drying alone, and the combination of air drying and UV irradiation with the system of Example 11:

TABLE 6

Persoz hardness results (dual cure effect, damping time in s)

| | Without UV irradiation | | | With UV irradiation | | |
|---|---|---|---|---|---|---|
| Example | After 20 hours | After 90 hours | After 10 days | After 20 hours | After 90 hours | After 10 days |
| 11 | 32 | 145 | 213 | 155 | 268 | 275 |

It can be clearly seen that air drying alone has a slow rise in hardness which may offer a handling problem with freshly coated substrates. The combination of air drying and irradiation crosslinking offers a good initial hardness, and increased final hardness values, both vis-à-vis the air drying only (left part of table 6). While the onset of crosslinking is, of course, accelerated by irradiation which could have been expected, the improved final hardness while preserving the elasticity of the coating film could not have been expected, as higher hardness usually goes with brittleness.

The invention claimed is:

1. A radiation curable aqueously dispersed polyester resin composition comprising an emulsifier D and the reaction product AC of a hydroxy functional polyester resin A and an olefinically unsaturated compound C which can be radically polymerised and which is attached to the polyester resin backbone by an ester linkage or a urethane linkage, wherein said emulsifier D is the polyesterification product of a fatty acid D1, a polyhydric alcohol D2 having at least three hydroxyl groups per molecule, a carboxylic acid D3 or its anhydride, and a monoalkoxy polyalkylene glycol D4, and wherein:

(a) when the olefinically unsaturated compound C is attached to the polyester resin backbone by an ester bond, the olefinically unsaturated compound C is an unsaturated acid C1 selected from the group consisting of alpha, beta-unsaturated aliphatic monocarboxylic acids, and monoesters of olefinically unsaturated aliphatic dicarboxylic acids, (b) when the olefinically unsaturated compound C is attached to the polyester resin backbone by a urethane bond, the olefinically unsaturated compound C used is an isocyanate-functional reaction product C2 of an unsaturated aliphatic alcohol C21 and a diisocyanate or polyfunctional isocyanate C22 having three or more isocyanate groups per molecule.

2. The composition of claim 1 additionally comprising an olefinically unsaturated compound B which can be radically polymerised.

3. The composition of claim 2 wherein the compound B is the reaction product of a polyol B1 and an olefinically unsaturated compound C which can be radically polymerised.

4. The composition of claim 1 wherein the polyester resin A is an esterification product of a fatty acid A1 having from 8 to 24 carbon atoms, a polyhydric aliphatic alcohol A3 having at least three hydroxyl groups, and an aromatic, cycloaliphatic or linear or branched aliphatic carboxylic acid A4 having at least two carboxyl groups, or the anhydride thereof, and optionally, an aliphatic or aromatic monocarboxylic acid A2 having at least two carbon atoms and not more than seven carbon atoms, and further optionally, an oil A5.

5. The composition of claim 3 wherein the polyol B1 is an aliphatic polyetherpolyol which is the reaction product of a 1,2-epoxyalkane B11 having from 2 to 6 carbon atoms and a polyhydric aliphatic alcohol B12 having at least three carbon atoms and at least three hydroxyl groups per molecule.

6. The composition of claim 1 wherein the specific unsaturation $n_u/m_{AC}$ is from 0.3 mol/kg to 3 mol/kg, where $n_u$ is the amount of substance of olefinic double bonds in a mass $m_{AC}$ of the reaction product AC.

7. The composition of claim 1 wherein the ratio of the mass $m_D$ of the emulsifier D to the mass $m_{AC}$ of the reaction product AC is from 0.03 to 0.25.

8. The composition of claim 1 wherein at least a part of the fatty acid D1 and/or at least a part of the polyhydric alcohol D2 in the emulsifier D is replaced by an oil which is the ester of one or more of fatty acids according to D1, and glycerol.

9. A method of utilizing the composition of claim 1 comprising adding one or more of additives selected from the group of photoinitiators, pigments, colourants, dispersing agents, flow additives, thickening agents, matting agents, and adhesion promoters, to the polyester resin composition of claim 1, mixing and homogenising the mixture thus obtained, to obtain a paint, coating or ink and applying the said paint, coating or ink to the surface of a substrate in the form of a wet film, drying or flushing off at least a part of the water comprised in the said film, and exposing the coated substrate to high energy radiation to cure the film.

10. The method of claim 9 wherein also siccatives are used as additives, and wherein the coated substrate is concurrently with, or after, the irradiation, subjected to air oxidation to provide air drying.

11. The composition of claim 4 wherein the oil A5 is an unsaturated oil.

* * * * *